US011941827B2

United States Patent
D'Ercoli et al.

(10) Patent No.: US 11,941,827 B2
(45) Date of Patent: Mar. 26, 2024

(54) SYSTEM AND METHOD OF 3D POINT CLOUD REGISTRATION WITH MULTIPLE 2D IMAGES

(71) Applicant: Datalogic IP Tech S.R.L., Calderara di Reno (IT)

(72) Inventors: Francesco D'Ercoli, Bologna (IT); Marco Cumoli, Monte San Pietro (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 338 days.

(21) Appl. No.: 17/505,471

(22) Filed: Oct. 19, 2021

(65) Prior Publication Data

US 2023/0125042 A1    Apr. 20, 2023

(51) Int. Cl.
  G06K 9/00     (2022.01)
  G06T 7/38     (2017.01)

(52) U.S. Cl.
  CPC ...... *G06T 7/38* (2017.01); *G06T 2207/20081* (2013.01); *G06T 2207/20084* (2013.01)

(58) Field of Classification Search
  CPC . G06T 7/68; G06T 7/337; G06T 2207/30004; G06T 2207/30201; G06T 2207/10028; A61B 5/0064; A61B 5/0077; A61B 5/103; A61B 5/742; A61B 90/36; A61B 2090/365; A61B 2034/105; A61B 5/1072; A61B 5/1075; A61B 5/1079
See application file for complete search history.

(56) References Cited

U.S. PATENT DOCUMENTS

| | | | |
|---|---|---|---|
| 9,153,025 B2 | 10/2015 | Jin et al. | |
| 10,235,606 B2* | 3/2019 | Miao | G06N 3/08 |
| 2007/0031064 A1* | 2/2007 | Zhao | G06T 7/30 |
| | | | 382/285 |
| 2008/0310757 A1* | 12/2008 | Wolberg | G06V 20/653 |
| | | | 382/285 |
| 2019/0005670 A1* | 1/2019 | DeTone | G06T 7/593 |

* cited by examiner

*Primary Examiner* — Dhaval V Patel
(74) *Attorney, Agent, or Firm* — Foley & Lardner LLP

(57) ABSTRACT

A computer-implemented method of performing a three-dimensional 3D point cloud registration with multiple two-dimensional (2D) images may include estimating a mathematical relationship between 3D roto-translations of dominant planes of objects in a 3D point cloud and bi-dimensional homographies in a 2D image plane, thereby resulting in a 3D point cloud registration using multiple 2D images. A trained classifier may be used to determine correspondence between homography matrices and inferred motion of the dominant plane(s) on a 3D point cloud for paired image frames. A homography matrix between the paired images of the dominant plane(s) on the 2D image plane may be selected based on the correspondence between the inferred motions and measured motion of the dominant plane(s) on the 3D point cloud for the paired image frames. The process may be less computationally intensive than conventional 2D-3D registration approaches.

20 Claims, 7 Drawing Sheets

SYSTEM AND METHOD OF 3D POINT CLOUD REGISTRATION WITH MULTIPLE 2D IMAGES

BACKGROUND

Image data registration may be defined as the process of transforming different sets of image data into a single coordinate system. For three-dimensional (3D) images, image data registration means finding optimum parameters for the transformation from 3D images (e.g., aerial images with 3D LiDAR) to two-dimensional (2D) data or vice-versa, when significant overlap is given. There is a need for image registration when images of the same scene are acquired at different times (e.g., landscape planning using remote sensing systems, automatic change detection in video surveillance systems, motion tracking in computer vision systems, monitoring of healing therapy and tumor evolution in medical imaging systems, etc.), when images of the same scene are acquired from different viewpoints (e.g. mosaicing in remote sensing systems, shape recovery and structure from motion in computer vision systems, coding in video compression systems), or when images of the same scene are acquired from different sensors (e.g., in medical imaging and vehicular navigation systems).

A well-known example is the registration of preoperative 3D CT images and intraoperative 2D X-ray images, where the image registration is estimated by iteratively optimizing a similarity measure (i.e., a difference between 2D and 3D images) that suffers of local maxima issues. Many different algorithms and approaches have been proposed, where each have advantages and disadvantages, mainly categorized in:

(i) feature-based matching: features/points are evaluated in the 2D image space (i.e., pixel coordinates) and back-project into 3D coordinates (i.e., x, y, z coordinates). When 3D/3D registration is involved, an Iterative Closest Point (ICP) algorithm may be used to minimize a difference between two points on a 3D point cloud, as understood in the art. As an example, some conventional methods propose a 3D-2D image registration that relates image features of 2D projection images to the transformation parameters of the 3D image by nonlinear regression. Also, in orthopedic surgery assessment and diagnoses, 3D/2D registration has been performed using the weighted histogram of image gradients as an image feature.

(ii) intensity-based matching: processing is directly performed on the image gray values, sometimes also utilizing statistical relationships between images, which is typically more computationally demanding such that there are no real-time methods (GPU-enabled execution times are typically performed in 0.5-2.0 seconds). As an example, similarity between corresponding 3D and 2D gradient covariances, mapped into the same space using back-projection, has been proposed (normalized scalar product of covariances is computed as similarity measure).

(iii) hybrid approaches: mixed approaches, such as between feature-based matching intensity-based matching.

Despite available literature, registration of 3D point-clouds to one or more 2D images is a very challenging registration task for most of current state-of-the-art 3D-2D image registration methods and the level of performance depends on multiple factors related to the specific application field. In medical applications, a number of parameters, such as lighting, positioning, and movement, can be controlled so the ability to use feature-based matching and/or intensity-base matching is possible. However, in industrial applications or other environments in which certain parameters, such as lighting, positioning, and movement, are not controllable or not easily controlled, conventional 3D/2D image registration processes, such as feature-based matching, intensity-based matching, and hybrid approaches, have shortcomings and do not work particularly well, especially with regard to real-time performance. As such, a 3D/2D image registration process that performs better than conventional processes in environments in which imaging parameters, such as lighting, positioning, and motion, are not easily controllable is needed. Moreover, while expensive 3D cameras may be capable of performing certain functionality, such as capturing images with sufficient resolution to determine sizing and performing barcode scanning, such expensive 3D cameras are impractical for most applications.

SUMMARY

To improve image registration when it comes to combining traditional 2D vision systems with 3D cameras capable of reconstructing the geometric structures of objects and scenes in order to obtain merged information coherent from a spatial point-of-view (e.g., for machine vision and identification tasks, rendering purposes, and the like), the principles described herein may be used. In an embodiment, estimate of a mathematical relationship between 3D roto-translations of dominant planes of objects in a 3D point cloud and bi-dimensional homographies in a 2D image plane may be computed, thereby resulting in a 3D point cloud registration using multiple 2D images. For environments in which objects (e.g., such as boxes) are imaged to determine sizes and/or object identifiers (e.g., barcodes, quick reference (QR) codes, watermarks, etc.), such imaging processes for registering 2D vision systems and 3D cameras may be utilized. A trained classifier may be used to determine which of multiple possible homography matrices describes motion of a dominant plane of a moving object between a pair of images of the moving object in the three-dimensional world. The principles described herein are less computationally intensive than conventional 2D-3D registration approaches as a result of taking advantage of dominant planes of the objects, so real-time 3D/2D registration and mapping processing may be performed. As a result of real-time registration and mapping being possible utilizing the principles provided herein, improved imaging in a variety of different environments, such as package monitoring along conveyer belts and warehouse applications, may be possible. Moreover, the principles provided herein may be embodied in stationary imaging systems and/or portable or handheld imaging systems.

A computer-implemented method and system for performing a three-dimensional 3D point cloud registration with multiple two-dimensional (2D) images may include determining relative position between a 2D camera and a 3D camera. A series of image frames including images of an object may be captured by the 2D and 3D cameras. At least one dominant plane of the object may be identified in the images on a 3D point cloud. Rigid motion of the dominant plane(s) on the 3D point cloud between paired image frames (i.e., two temporal, subsequent image frames) may be measured in the series of the image frames. The dominant plane(s) of the object may be identified as 2D planar surface(s) on a 2D image plane (e.g., CCD or CMOS sensor plane) of the 2D camera. Possible homography matrices between the paired image frames of the dominant plane(s) imaged on the 2D image plane may be estimated. A trained classifier may be utilized to determine correspondence between the homography matrices and inferred motion of the dominant plane(s) on the 3D point cloud for the paired image frames. A homography matrix between the paired images of the dominant plane(s) on the 2D image plane may be selected based on the correspondence between inferred motion and measured motion of the dominant plane(s) on the 3D point cloud for the paired image frames. The dominant plane(s) of the imaged object may be registered from the 2D image plane to the 3D point cloud by associating three-dimensional coordinates to pixels in the 2D image (e.g., using interpolation).

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
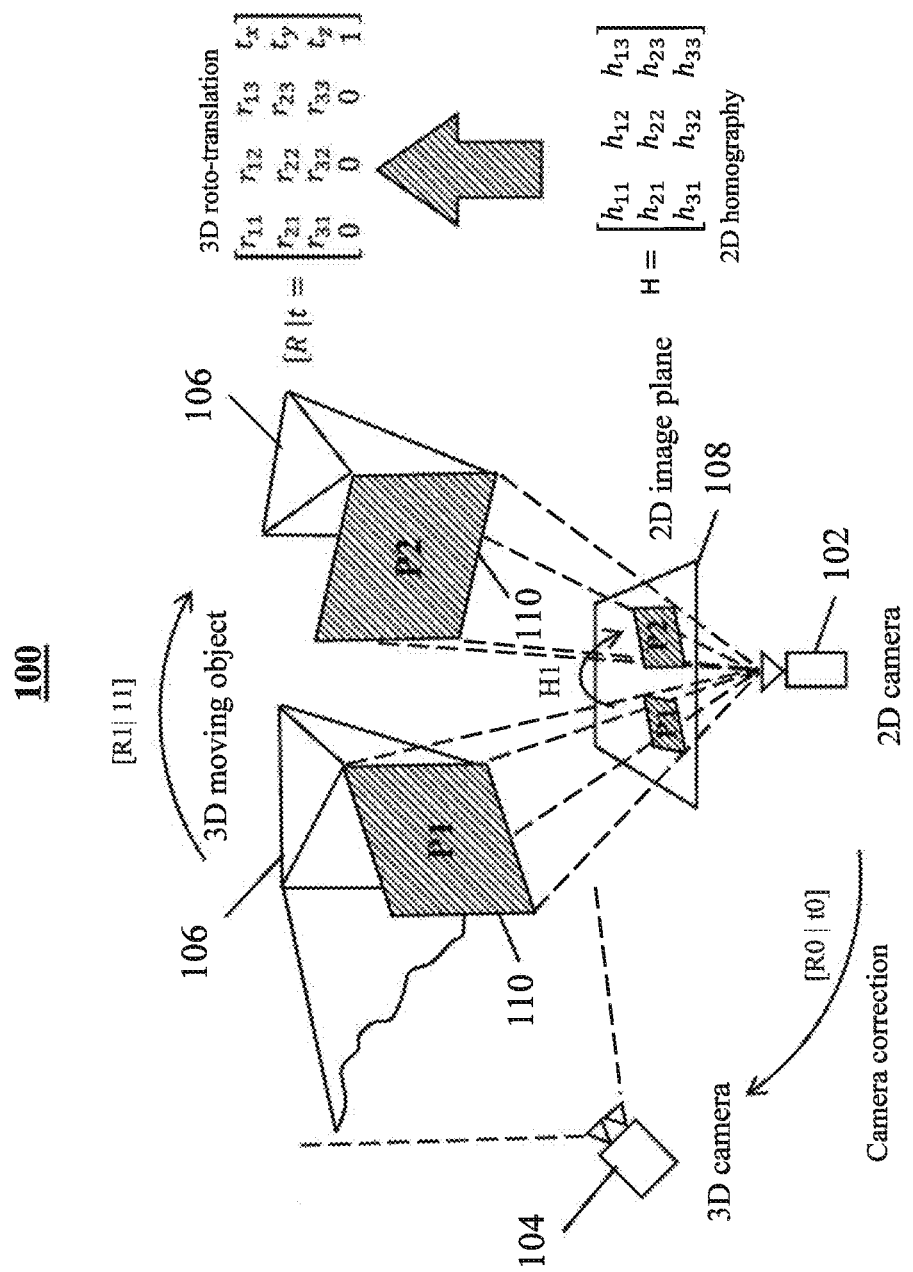
FIG. 1 is an illustration of an illustrative concept for transforming multiple 2D images in order to register or map the 2D image data into a single 3D coordinate system with multiple 3D images related to a 3D point cloud.

With regard to FIG. 1, an illustration of an illustrative configuration and image processing concept 100 for transforming multiple 2D images in order to register or map the 2D image data into a single 3D coordinate system with multiple 3D images related to a 3D point cloud is shown. A 2D camera 102 and a 3D camera 104 are shown to be oriented to capture images of a 3D moving object 106. Image processing may be used to transform 2D image data (e.g., data as brightness values) of the multiple 2D images captured by the 2D camera 102 to be data registered or image mapped into the single 3D coordinate system with multiple 3D images related to the 3D point cloud (e.g. data as simple georeferenced points). A 2D image plane 108 (e.g., the CCD or CMOS sensor plane) is shown in front of and normal to the 2D camera 102, where images of objects, such as the 3D moving object 106, are captured in projected relation to the 2D image plane 108 as the objects pass in front of the 2D camera 102.

The 2D camera 102 and the 3D camera 104, which are displaced by a roto-translation matrix [R0|t0] (also known as a camera correction), are framing the 3D moving object 106 in which dominant planes P1 and P2 (e.g., sides of boxes) of the object 106 are recognizable, as is typical in many practical applications. A roto-translation matrix is used to mathematically describe rotation and translation of a rigid object, such as a rigid planar surface of an object. Because the dominant planes P1 and P2 of the object 106 move rigidly (i.e., without much or any distortion) in space, from a first time instant (and first image frame) to a second time instant (and second image frame), a visible and dominant plane may transform from P1 to P2 according to a roto-translation matrix [R1|t1]. At the same time, the projections of the planes P1 and P2 on the 2D image plane 108 of the 2D camera 102 are transformed from P1' to P2' on the 2D image plane 108 according to and described by a 2D homography matrix H1. As understood in the art, any two images of the same planar surface in space are related by a homography. The registration of 2D images on 3D images is precisely performed by finding a mathematical relationship (at i-th time) existing between every roto-translation matrix [Ri|ti] in 3D space and homography Hi in the 2D image plane.

Figure 2:
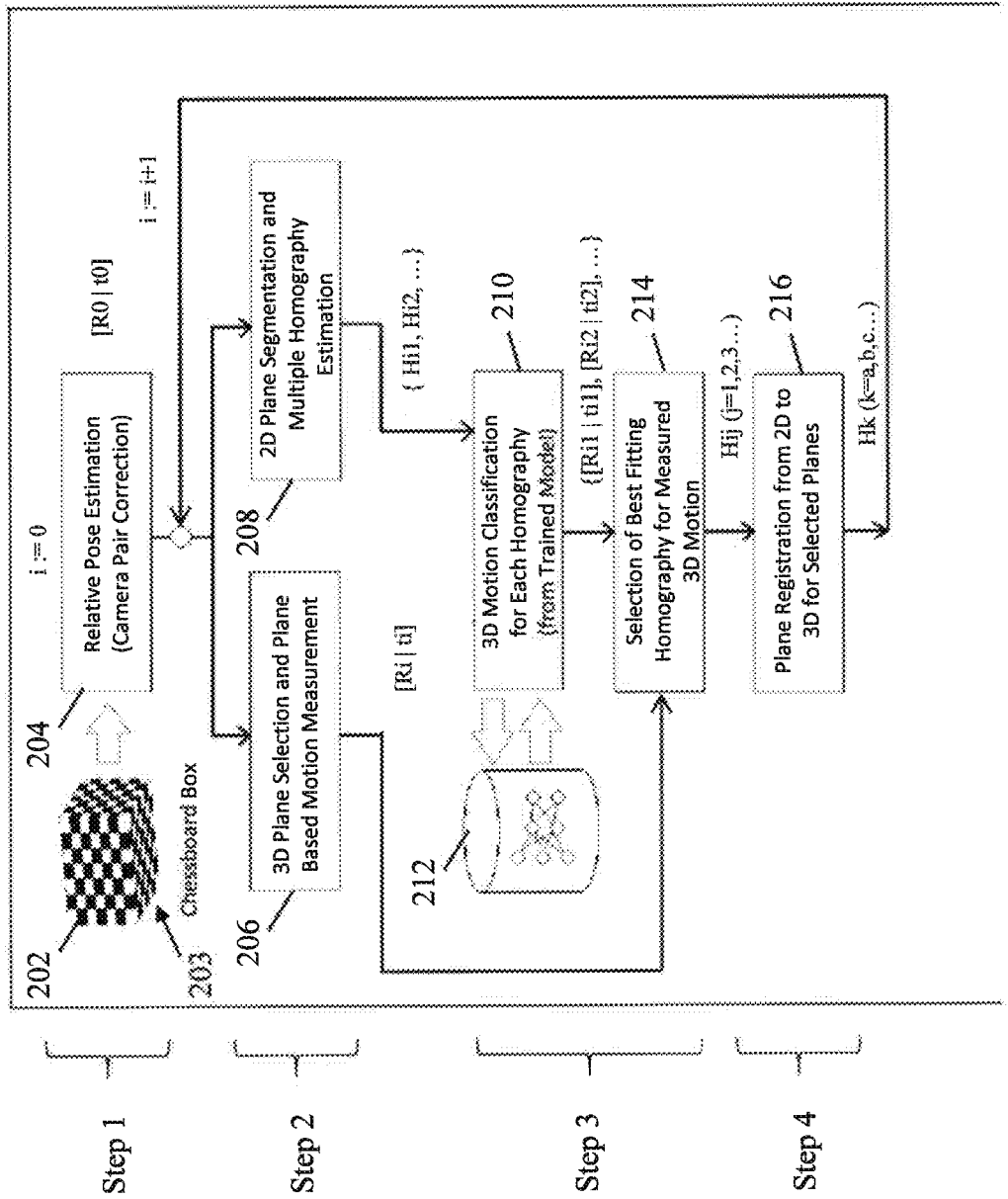
FIG. 2 is a flow chart of an illustrative image registration process for registering multiple 2D images into a 3D point cloud.

With regard to FIG. 2, a flow chart of an illustrative image registration process 200 for registering multiple 2D images into a 3D point cloud is shown. An object or box 202 is shown with distinguishable chessboard features 203 on every side of the object 202. The object 202 may be utilized in performing an alignment between the 2D camera and 3D camera. It should be understood that alternative objects may be utilized for alignment purposes. A first step to the process 200 may start at Step 1, sub-step 204, where a relative position estimation or camera pair correction, if not already known, as in the case of fixed positioning of the cameras, between 2D and 3D cameras may be performed by creating a roto-translation matrix [R0|t0]. The estimate may be performed by using the object 202 with a known 3D pattern, such as provided by the chessboard features 203 on every side of the object 202. Detecting chessboard features 203 are well known in the art, and relative positioning of a certain number of features is also known. As shown, an index variable i may be set to an initial value of zero. The relative position estimation of sub-step 204 enables a camera pair correction to be determined to establish a relative positioning between the 2D camera and the 3D camera such that, by applying the camera pair correction [R0|t0], the 2D and 3D cameras may be considered coplanar and with a coincident optical axis. Setting a positioning baseline may be utilized for supervised classification of motion, as further described herein.

At Step 2, a pair of parallel sub-steps 206 and 208 may be performed while working on the 3D point cloud. At step 206, one or more dominant planes of the moving objects may be identified and selected (i.e., "plane selection"), and motion of the dominant plane(s) may be quantified or measured using a roto-translation matrix (e.g., defined by [Ri|ti] matrix) involving two subsequent time frames. It should be understood that processes to segment a 3D point cloud into 3D planes are generally known in the art. In some cases, approaches may be performed on very fast, single CPU, where planar segmentation of depth images may be extracted from a 3D point cloud. In an embodiment, at step 208, which may be simultaneously or substantially simultaneously (e.g., executed in parallel processes on a computing device) performed with step 206, from the 2D image(s), (i) one or more of the dominant planar surfaces may be identified and (ii) homographies between possible pairs of planar surfaces (in a single time frame pair) may also be estimated as a series of homography matrices {Hi1, Hi2, . . . }. The set of homography matrices represent possible motions of the dominant planes between the pairs of frames (see FIG. 3). For example, every plane on the box 302 of FIG. 3 may be motion estimated. It is understood that tracking planes in 2D images is not a simple process, and certainly not as simple as tracking planes in a 3D point cloud. However, tracking planes in 2D images is not necessary when utilizing the principles provided herein, as is described hereinbelow. Simply, all possible combined homographies may be considered. More specifically, on the 2D image plane, the planar surfaces of the object 302 may be simply extracted (identified) with no need to track the planar surfaces by using homographies. One possible approach may be to utilize line matching in image pairs of scenes with dominant planes.

Figure 4:
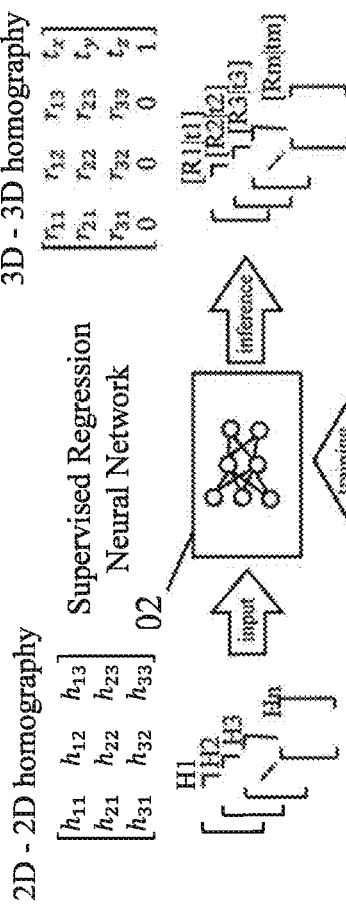
FIG. 4 is an illustration of an illustrative process for performing 3D motion classification from homographies.
Figure 4:
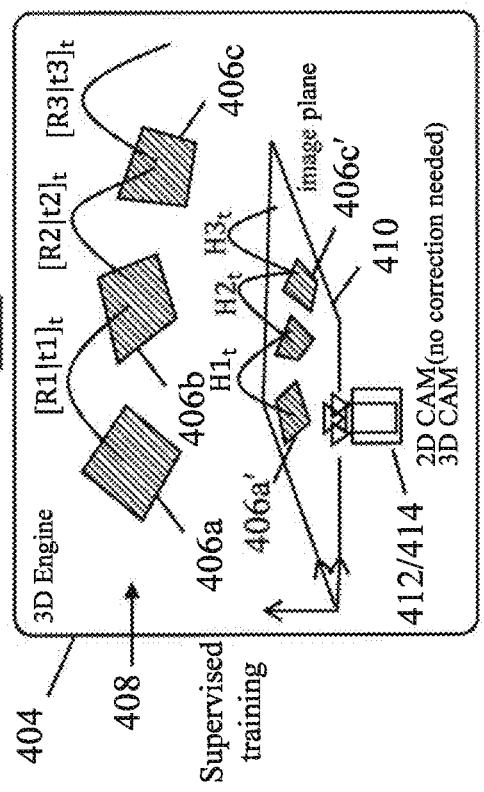

At Step 3, sub-step 210, 3D motion classification for each homography, utilizing a previously trained classifier 212 and a stored related inference model, it becomes possible (i) to classify the most probable associated three-dimensional rigid motion among the predicted set {[Ri1|ti1], [Ri2|ti2], . . . } for each of the possible calculated homographies {Hi1, Hi2, . . . }, and then (ii) to select at sub-step 214, within the set, the j-th index corresponding (i.e., more similar in terms of vector distance) to the actually measured motion [Ri|ti] (see FIG. 4). As shown, [Ri|ti] is computed at step 206, and the set {[Ri1|ti1], [Ri2|ti2], . . . [Rin|tin]} is the output of the trained classifier 212. The classifier 212 may be an artificial neural network or support-vector machine. In an alternative embodiment, the classifier may be a Bayes filter, Kalman filter, or any other supervised trained classifier 212 or estimator capable of performing a 3D motion classification and estimation for each homography. As input to the artificial neural network, the numerical values representing the entries of the homography matrices are supplied. These matrices are 3×3 in size, but once homogeneous, the homography matrices are reduced to 8 independent values. Therefore, an artificial NN with at least 8 inputs is used. As output, there are the numerical values of the roto-translation matrices, that is, as typical for the transformation matrices used in 3D computer graphics, 4×4, reduced to 15 values in the homogeneous form (three values for x, y and z, plus an additional term which usually has a value of 1). Therefore, an artificial NN with at least 15 outputs is utilized. As usual, the processing of the artificial NN, which can have a certain number of internal layers, in addition to those of input and output, includes using neuron weights (set during training phase) and internal connections of the neural network to produce and output the correct (statistically inferred) values based on the input values.

At Step 4, sub-step 216 may be performed to register selected dominant plane(s) from the 2D image plane to the 3D point cloud, resulting in registered information with both brightness and 3D coordinates (i.e., x, y, z coordinates) for every data point or pixel in the 2D image. In particular, knowing the three-dimensional plane P and the corresponding bi-dimensional plane P' at every point in time (i.e., P1, P2 . . . and P1', P2' . . . ), every point may be mapped from P' (2D) to P (3D) by establishing the correspondence between some points (e.g., four corners of a plane may be used) and calculating the coordinates of the remaining points with bilinear interpolation techniques.

Figure 3:
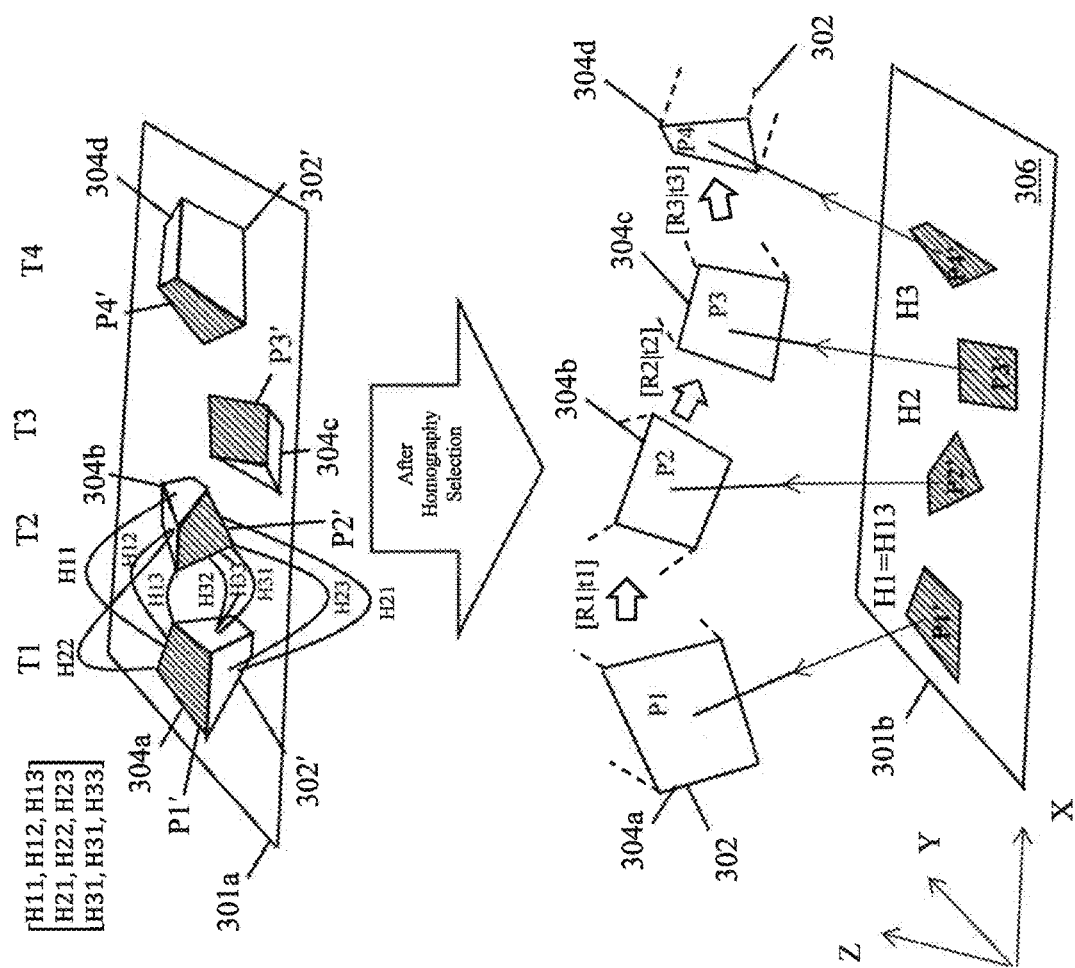
FIG. 3 is an illustration of an illustrative process for performing a 2D homography selection based on 3D motion.

With regard to FIG. 3, an illustration of an illustrative concept 300 of 2D homography selection based on 3D motion of an object 302 with a projection moving across a 2D image plane 301a and 301b is shown. The object 302 is shown to be at different positions 304a, 304b, 304c, and 304d (collectively 304) at different points in respective times T1-T2-T3-T4. From a viewpoint of a camera (not shown), the object 302 at each of the different positions 304 appear to be different. At each of the different positions 304, one or more dominant planes may be identified and selected. As shown, a three-dimensional planes P1'-P4' (collectively P') that is highlighted as imaged onto the 2D image plane 301a may be selected.

As is understood in the art, the 3D object 302 may be projected onto (or captured by) a 2D camera via the 2D image sensor plane 301a/301b. Given the moving object 302 in the position 304a and the projection of this object on the plane of the 2D sensor 301a at the instant T1, by selecting any plane of this projection on the plane of the 2D sensor 301a at the instant T1, a tuple of homographies may be defined between that planes and all the planes in the projection of the object 302 in the position 304b on the plane of the 2D sensor 301a at time T2. For example, taking the plane P1' in FIG. 3, the tuple of homographies (H11 H12 H13) may be defined. Repeating this operation for any plane of the projection of this object on the plane of the 2D sensor 301a at the instant T1, the matrix of all possible homographies is defined (e.g. H11 H12 H13 H21 H22 H23 H31 H32 H33) for the time pair T1-T2.

This matrix of homographs may be defined for each pair of successive instants (T2-T3, T3-T4, . . . ). Each homography contained in this matrix defined for each couple of successive instants is given as an input to the trained classifier 402, which produces as output a roto-translation matrix [R|t]. Among all the roto-translations obtained relative to a couple of successive instants, the roto-translation [R|t] most similar to the roto-translation actually measured in the 3D point cloud is selected. In this way, for the pair of successive acquisition instants T1-T2, the roto-translation [R1|t1] measured in 3D and the homography H1 on the plane 301a/301b, which is that homography that when is given as input to the classifier gives as output the roto-translation selected by the trained classifier in the previous step, which is the roto-translation that is closest to the real 3D roto-translation. Having defined H1, the plane P1' is uniquely identified in the projection that corresponds to the 3D plane of P1, that is the plane that was used for the calculation of the real roto-translation in 3D. Having P1' and P1, the registration is matter of associating the points in P1' to the three-dimensional coordinates in P1.

With regard to FIG. 4, an illustration of an illustrative sub-process 400 for performing motion classification from 3D homographies is shown. The sub-process 400 may include building a supervised classifier 402, such as one with a regression neural network, capable of receiving homography matrices H1-Hn (between pairs of planes on a 2D sensor) and outputting corresponding inferred roto-translation matrices (in the 3D space) [R1|t1]-[Rn|tm].

A training phase of the supervised classifier 402 may be performed offline at design-time before running the supervised classifier 402 in an online inference phase. The supervised classifier 402, which may be implemented as a regression neural network, may be trained with a 3D graphics engine 404 that produces random moving planes 406a-406c in a virtual three-dimensional space 408 and calculates corresponding projections 406a'-406c' in a 2D image plane 410 of a 2D sensor of a 2D camera 412 using a known and adjusted setup (i.e., with 2D and 3D cameras 412 and 414 being coplanar and with coincident optical axes in the same coordinate reference system). Regression deep neural networks and training thereof using synthetic or simulated data, such as those within 3D-graphics GPU's physics engines, are understood in the art.

Figure 5:
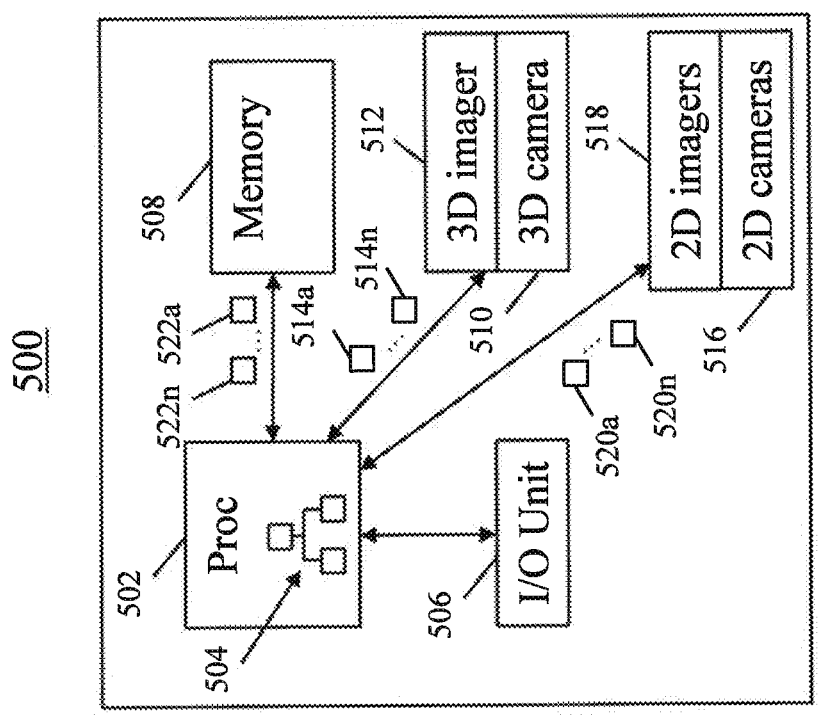
FIG. 5 is a block diagram of an illustrative imaging system for capturing and processing 2D and 3D image data.

With regard to FIG. 5, a block diagram of an illustrative imaging system 500 for capturing and processing 2D and 3D image data is shown. The system 500 may include a processor 502 and software 504 executed by the processor 502. It should be understood that the processor 502 may include one or more processors, such as a general processor, digital signal processor, image processor, ASIC, and/or any other processor. The software may be configured to perform the processing and functionality described herein, including executing a neural network or other classifier. It should be understood that the system 500 may be implemented with one or multiple machines that execute one or more processors that form the processor 502.

The processor 502 may be in communication with an input/output (I/O) unit 506 that is configured to communicate data, such as image data and/or data derived from image processing, over a local or wide area communications network. The processor 502 may further be in communication with a memory 508 configured to store image data and data such as homography and roto-translation matrices, derived by processing the image data.

The processor 502 may further be in communication with a 3D camera 510 including a 3D imager 512 configured to generate 3D image data 514a-514n (collectively 514). In addition, the processor 502 may be in communication with multiple 2D cameras 516 with corresponding 2D imagers 518 configured to generate 2D image data 520a-520n (collectively 520). The cameras 510 and 516 may communicate the image data 514 and 520 to the processor 502 to be processed by the software 504, as described herein. The 3D and 2D image data 514 and 520 may result in data 522a-522n (collectively 522), such as processed image data and data derived therefrom, that is stored in non-transitory memory 508. In an embodiment, the processed image data 522 may also be communicated to the I/O unit 506 for communication to a remote system. It should be understood that the system 500 may further include an electronic display, user interface, and/or other controls, as understood in the art, to enable a user to interface with the system.

Figure 6:
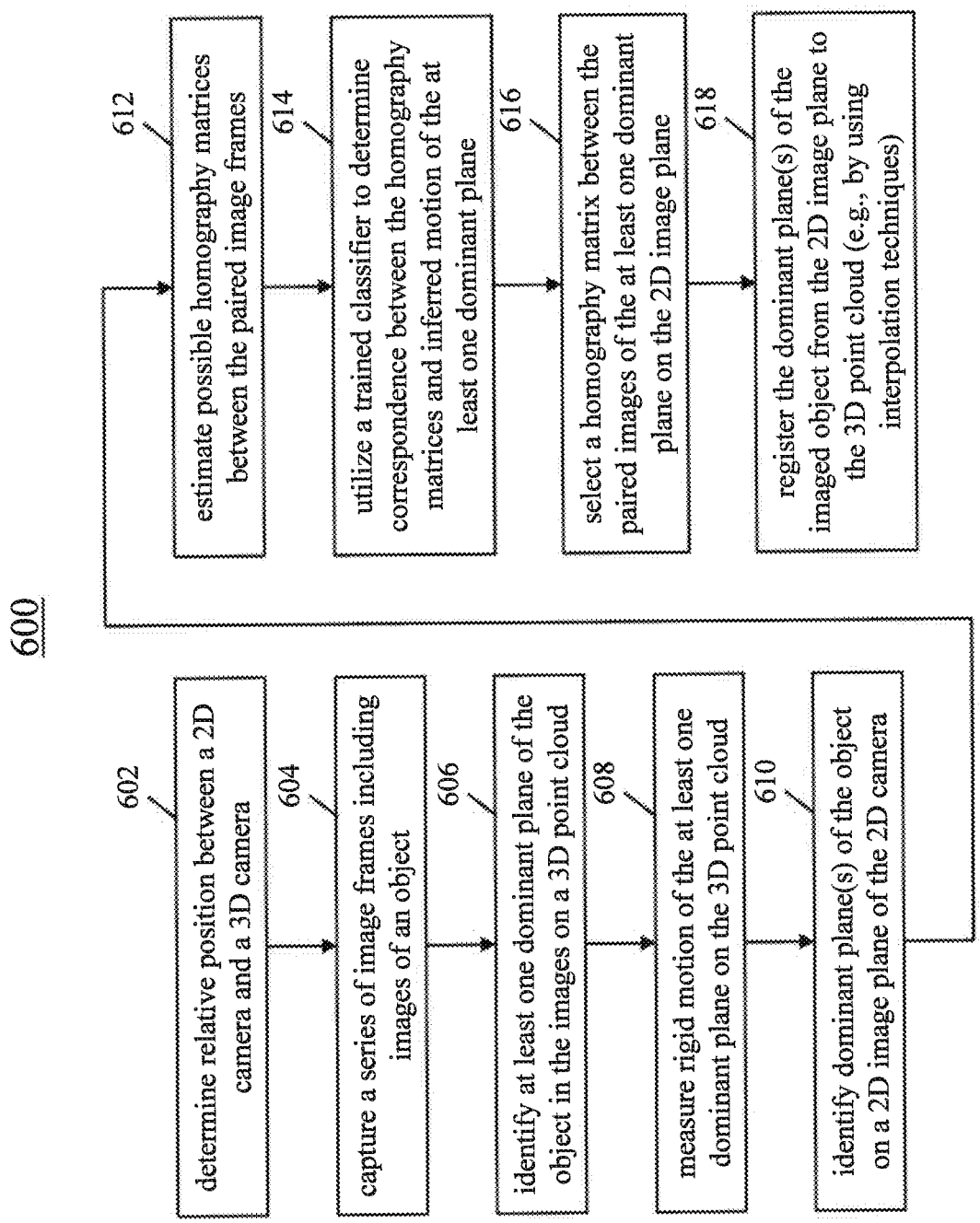
FIG. 6 is a flow diagram of an illustrative process for registering 2D images in a 3D point cloud.

With regard to FIG. 6, a flow diagram of an illustrative process 600 for registering 2D images in a 3D point cloud is shown. The process 600 may start at step 602, where an alignment between a 2D camera and a 3D camera may be made. A series of image frames including images of an object by the 2D and 3D cameras may be captured at step 604. At step 606, at least one dominant plane of the object in the images on a 3D point cloud may be identified. Rigid motion of the dominant plane(s) on the 3D point cloud between paired image frames in the series of the image frames may be measured at step 608. Paired image frames may be sequential image frames (e.g., image frames 2 and 3) or non-sequential image frames (e.g., image frames 2 and 5), where each of the paired image frames are captured at different points in time. The dominant plane(s) of the object as 2D planar surfaces on a 2D image plane of the 2D camera may be identified at step 610.

At step 612, possible homography matrices between the paired image frames of the dominant plane(s) imaged on the 2D image plane may be estimated. A trained classifier may be utilized at step 614 to determine correspondence between the homography matrices found at step 612 (as input for the trained classifier) and inferred motions (as output for the trained classifier) of the dominant plane(s) on the 3D point cloud for the paired image frames. At step 616, a homography matrix between the paired images of the dominant plane(s) on the 2D image plane may be selected based on the correspondence between the inferred motions and measured motion of the dominant plane(s) on the 3D point cloud for the paired image frames made at step 608, finally identifying the two dominant planes (in the same point in time) to be registered. Registration of the dominant plane(s) of the imaged object from the 2D image plane to the 3D point cloud may be made at step 618 through known correspondence between points of the two known corresponding planes related to the same point in time (e.g., using interpolation).

The process, in utilizing a trained classifier, may include utilizing a trained neural network. Estimating the rigid motion may include estimating a roto-translation matrix between the paired image frames. Selecting the homography matrix may include selecting best fitting possible roto-translation matrix by computing minimum vector distances between the classified (predicted) roto-translation matrix and the measured roto-translation matrix. Capturing paired image frames may include periodically capturing image frames.

Utilizing a trained classifier may include utilizing a 3D graphics engine to produce random moving planes in a virtual 3D space, and calculating projections of the random moving planes in virtual images of the 2D sensor using a known and adjusted setup. It should be understood that non-random moving planes may additionally and/or alternatively be utilized. Using a known and adjusted setup may include using a known and adjusted setup with 2D and 3D cameras being coplanar and with coincident optical axes in the same coordinate reference system. Alternative configurations for training may be utilized.

The process may further include utilizing the registered 2D points in the 3D point cloud in dimensioning the object. The registered 2D points in the 3D point cloud may be utilized in reading a machine-readable indicia on the object. The object may be identified as the object enters an area by extracting physically meaningful surfaces of the package in the 3D point cloud after registering the 2D planar surface(s) in the 3D point cloud.

It should be understood that while the principles provided herein are described with regard to dominant planes of an object, the processes described herein may operate on soft objects that have limited or no planes per se and be capable of registering 2D images into a 3D point cloud, but with slightly less precision. Moreover, while some of the image processing techniques are known, the combination of the image processing techniques for performing the particular functionality described herein are not.

Figure 7:
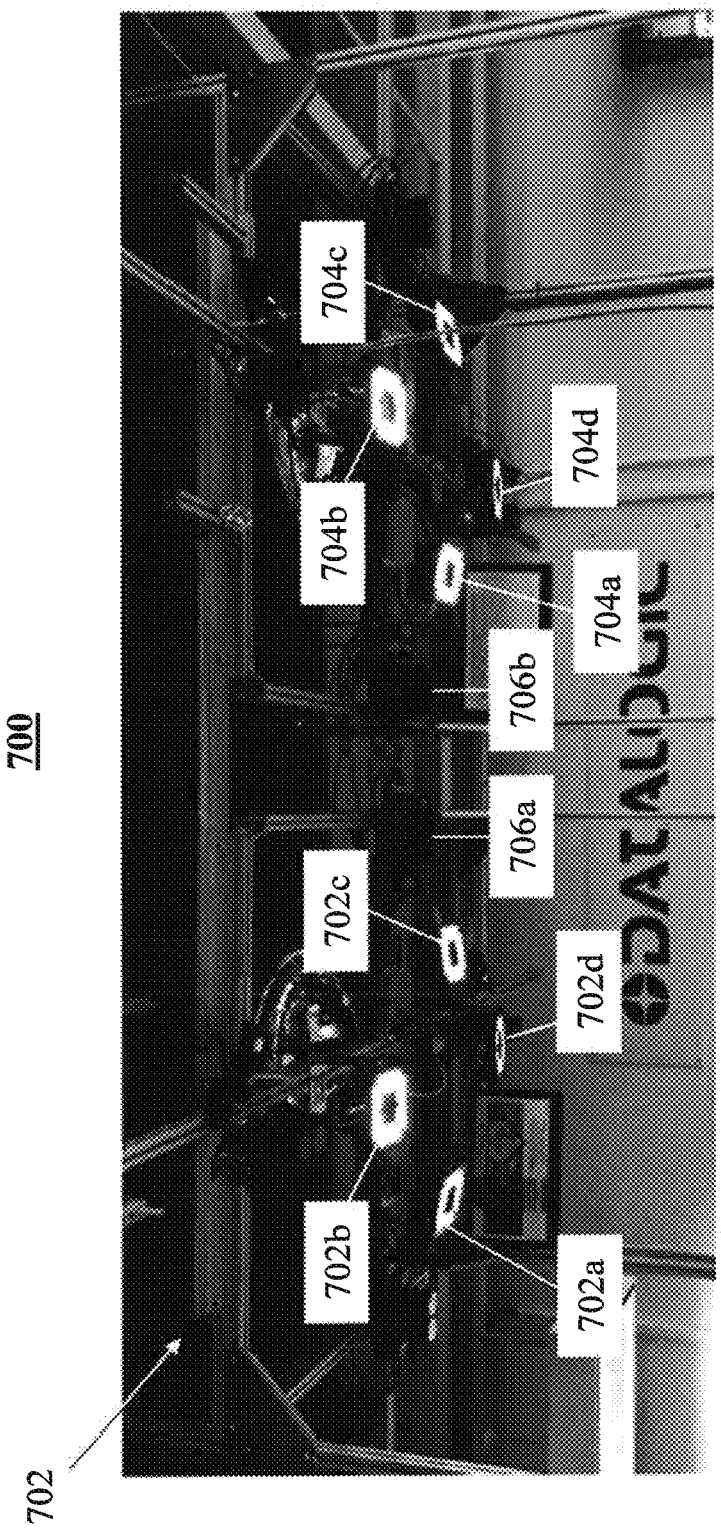
FIG. 7 is an illustration of an illustrative configuration of combined multiple 2D cameras and a 3D imaging system for use of performing package detection within a pallet area or other area with overhead imaging.

With regard to FIG. 7, an illustration of an illustrative system 700 configured of a 2D imaging system formed of multiple 2D cameras 702a-702d (collectively 702) and 704a-704d (collectively 704) and 3D imaging system including a 3D imaging system formed by 3D cameras 706a and 706b (collectively 706) for use in performing package detection within a pallet area is shown. In particular, traditional 2D vision systems may be combined with 3D cameras capable of reconstructing geometric structures of objects and scenes in order to obtain merged information coherent from spatial points-of-view (e.g., for machine vision tasks, rendering purposes, and the like). Two use cases are as follows:

In a pallet monitoring application, the 3D camera 706 may be used to detect packages and/or operators that enter the pallet area from one of the pallet side in combination with a set of 2D imaging readers (e.g., a matrix of 2D cameras) for barcode reading. Currently, conventional 3D imaging systems (stereo cameras plus inspection software) has several limitations in classifying packages and operators, which leads to a limitation in overall performance, mainly in the detection of the packages entered in the pallet area without code reading or during an packages rearrangement by an operation. Using the principles described herein, augmentation of the performance of the 3D imaging system in terms of its own capability to automatically extract physically-meaningful structures from the pallet scene may be performed. In operation, an imaging process using the system 700 may augment a 3D point cloud and enable the 3D point cloud engine to work with "richer" information so as to obtain better results for package detection and package sizing. The pallet monitoring application suits the process well due to the presence of dominant planes (i.e., surfaces of packages positioned on pallets or moving through the pallet area beneath the 2D and 3D cameras 702, 704, and 706). The method described herein is applicable for each combination of one of the 3D cameras present in the system and one of the 2D cameras of the system.

In a 3D dimensioner application, a package dimensioning and barcode reading station may include one or multiple 3D cameras (for dimensioning) plus one or more 2D readers for barcode reading. In an embodiment utilizing the processes described herein, a 3D point cloud may be augmented to enable a 3D point cloud engine of a 3D dimensioner to work with "richer" information to obtain better results in package dimensioning. Using a classifier, such as described in FIG. 3, provides for improved registration between the 2D and 3D cameras such that improved packaging dimensioning and barcode reading results. The method described herein is applicable for each combination of one of the 3D cameras present in the system and one of the 2D cameras of the system.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A computer-implemented method of performing a three-dimensional 3D point cloud registration with multiple two-dimensional (2D) images, said method comprising:
   determining relative position between a 2D camera and a 3D camera;
   capturing a series of image frames including images of an object by the 2D and 3D cameras;
   identifying at least one dominant plane of the object in the images on a 3D point cloud;
   measuring rigid motion of the at least one dominant plane on the 3D point cloud between paired image frames in the series of the image frames;
   identifying the at least one dominant plane of the object as 2D planar surfaces on a 2D image plane of the 2D camera;
   estimating possible homography matrices between the paired image frames of the at least one dominant plane imaged on the 2D image plane;

utilizing a trained classifier to determine correspondence between the homography matrices and inferred motions of the at least one dominant plane on the 3D point cloud for the paired image frames;

selecting a homography matrix between the paired images of the at least one dominant plane on the 2D image plane based on the correspondence between the inferred motions and measured motion of the at least one dominant plane on the 3D point cloud for the paired image frames; and registering the at least one dominant plane of the imaged object from the 2D image plane to the 3D point cloud.

2. The method according to claim 1, wherein utilizing a trained classifier includes utilizing a trained neural network.

3. The method according to claim 1, wherein measuring the rigid motion includes defining a roto-translation matrix between the paired image frames.

4. The method according to claim 1, wherein selecting the homography matrix includes selecting best fitting possible homography matrices between the images of the paired image frames by computing minimum vector distances between roto-translation matrices.

5. The method according to claim 1, wherein capturing paired image frames includes periodically capturing image frames.

6. The method according to claim 1, wherein utilizing a trained classifier includes:
utilizing a 3D graphics engine to produce random moving planes in a virtual 3D space; and
calculating projections of the random moving planes in virtual images of the 2D sensor using a known and adjusted setup.

7. The method according to claim 6, wherein using a known and adjusted setup includes using a known and adjusted setup with 2D and 3D cameras being coplanar and with coincident optical axes in the same coordinate reference system.

8. The method according to claim 1, wherein registering the at least one dominant plane of the imaged object from the 2D image plane to the 3D point cloud is performed by using interpolation techniques.

9. The method according to claim 1, further comprising utilizing the registered 2D points in the 3D point cloud in dimensioning the object.

10. The method according to claim 1, further comprising identifying the object as the object enters an area by extracting physically meaningful surfaces of the package in the 3D point cloud after registering the at least one 2D planar surfaces in the 3D point cloud.

11. A system for performing a three-dimensional 3D point cloud registration with multiple two-dimensional (2D) images, said system comprising:
a 2D camera;
a 3D camera;
a processor in communication with the 2D and 3D cameras, and configured to:
determine relative position between the 2D and 3D cameras;
cause the 2D and 3D cameras to capture a series of image frames including images of an object;
generate a 3D point cloud from image of the object captured by the 3D camera;
identify at least one dominant plane of the object in the images on the 3D point cloud;
measure rigid motion of the at least one dominant plane on the 3D point cloud between paired image frames in the series of the image frames;
identify the at least one dominant plane of the object as 2D planar surfaces on a 2D image plane of the 2D camera;
estimate possible homography matrices between the paired image frames of the at least one dominant plane imaged on the 2D image plane;
utilize a trained classifier to determine correspondence between the homography matrices and inferred motion of the at least one dominant plane on the 3D point cloud for the paired image frames;
select a homography matrix between the paired images of the at least one dominant plane on the 2D image plane based on the correspondence between the inferred motions and measured motion of the at least one dominant plane on the 3D point cloud for the paired image frames; and
register the at least one dominant plane of the imaged object from the 2D image plane to the 3D point cloud.

12. The system according to claim 11, wherein the processor, in utilizing a trained classifier, is configured to utilize a trained neural network.

13. The system according to claim 11, wherein the processor, in measuring the rigid motion, is configured to define a roto-translation matrix between the paired image frames.

14. The system according to claim 11, wherein the processor, in selecting the homography matrix, is configured to select best fitting possible homography matrices between the images of the paired image frames by computing minimum vector distances between roto-translation matrices.

15. The system according to claim 11, wherein the processor, in capturing paired image frames, is configured to periodically capture image frames.

16. The system according to claim 11, wherein the processor, in utilizing a trained classifier, is further configured to:
utilize a 3D graphics engine to produce random moving planes in a virtual 3D space; and
calculate projections of the random moving planes in virtual images of the 2D sensor using a known and adjusted setup.

17. The system according to claim 16, wherein the processor, in using a known and adjusted setup, is further configured to use a known and adjusted setup with 2D and 3D cameras being coplanar and with coincident optical axes in the same coordinate reference system.

18. The system according to claim 11, wherein the processor, in registering the at least one dominant plane of the imaged object from the 2D image plane to the 3D point cloud, is further configured to use interpolation techniques.

19. The system according to claim 11, wherein the processor is further configured to utilize the registered 2D points in the 3D point cloud in dimensioning the object.

20. The system according to claim 11, wherein the processor is further configured to identify the object as the object enters an area by extracting physically meaningful surfaces of the package in the 3D point cloud after registering the at least one 2D planar surfaces in the 3D point cloud.

* * * * *